(12) United States Patent
Fink et al.

(10) Patent No.: US 11,715,302 B2
(45) Date of Patent: Aug. 1, 2023

(54) AUTOMATIC TAGGING OF IMAGES USING SPEECH RECOGNITION

(71) Applicant: STREEM, INC., Portland, OR (US)

(72) Inventors: Ryan R. Fink, Vancouver, WA (US); Sean M. Adkinson, North Plains, OR (US)

(73) Assignee: STREEM, LLC, Portland, OR (US)

( * ) Notice: Subject to any disclaimer, the term of this patent is extended or adjusted under 35 U.S.C. 154(b) by 377 days.

(21) Appl. No.: 16/547,391

(22) Filed: Aug. 21, 2019

(65) Prior Publication Data

US 2020/0065589 A1    Feb. 27, 2020

Related U.S. Application Data

(60) Provisional application No. 62/745,092, filed on Oct. 12, 2018, provisional application No. 62/720,741, filed on Aug. 21, 2018.

(51) Int. Cl.
*G06V 20/40* (2022.01)
*G10L 25/78* (2013.01)
*G10L 15/22* (2006.01)

(52) U.S. Cl.
CPC .............. *G06V 20/41* (2022.01); *G10L 15/22* (2013.01); *G10L 25/78* (2013.01)

(58) Field of Classification Search
CPC combination set(s) only.
See application file for complete search history.

(56) References Cited

U.S. PATENT DOCUMENTS

| 9,553,841 | B1* | 1/2017 | Skinner | H04L 12/1895 |
| 2008/0120328 | A1* | 5/2008 | Delgo | G06F 16/7335 |
| | | | | 707/999.102 |
| 2008/0263583 | A1* | 10/2008 | Heath | G06Q 30/0273 |
| | | | | 705/14.69 |
| 2008/0288460 | A1* | 11/2008 | Poniatowski | H04N 21/4532 |
| 2009/0125936 | A1* | 5/2009 | Kulasekaran | H04L 65/762 |
| | | | | 725/32 |
| 2010/0054525 | A1* | 3/2010 | Gong | G06T 7/11 |
| | | | | 382/100 |
| 2010/0306656 | A1* | 12/2010 | Moloney | G06F 16/70 |
| | | | | 715/723 |
| 2014/0168056 | A1* | 6/2014 | Swaminathan | G06F 3/147 |
| | | | | 345/156 |
| 2014/0169752 | A1* | 6/2014 | May | G06F 16/7867 |
| | | | | 386/224 |
| 2014/0188669 | A1* | 7/2014 | Freeman | G06T 11/00 |
| | | | | 705/27.2 |
| 2014/0233917 | A1* | 8/2014 | Xiang | H04S 3/008 |
| | | | | 386/285 |

(Continued)

*Primary Examiner* — Solomon G Bezuayehu
(74) *Attorney, Agent, or Firm* — Schwabe Williamson & Wyatt

(57) ABSTRACT

Methods for automatically tagging one or more images and/or video clips using a audio stream are disclosed. The audio stream may be processed using an automatic speech recognition algorithm, to extract possible keywords. The image(s) and/or video clip(s) may then be tagged with the possible keywords. In some embodiments, the image(s) and/or video clip(s) may be tagged automatically. In other embodiments, a user may be presented with a list of possible keywords extracted from the audio stream, from which the user may then select to manually tag the image(s) and/or video clip(s).

16 Claims, 5 Drawing Sheets

(56) References Cited

U.S. PATENT DOCUMENTS

| | | | |
|---|---|---|---|
| 2015/0092007 A1* | 4/2015 | Koborita | H04N 5/278 348/14.07 |
| 2015/0147045 A1* | 5/2015 | Birnkrant | G06V 20/47 386/241 |
| 2017/0091879 A1* | 3/2017 | Kanner | G06Q 10/10 |
| 2018/0181997 A1* | 6/2018 | Sanjeevaiah Krishnaiah | H04L 67/53 |
| 2018/0314888 A1* | 11/2018 | Koul | G06V 20/20 |
| 2019/0004683 A1* | 1/2019 | Pahud | G06T 19/006 |
| 2019/0200154 A1* | 6/2019 | Vishwanathan | G06K 9/6268 |
| 2019/0246075 A1* | 8/2019 | Khadloya | G06N 3/006 |
| 2019/0295289 A1* | 9/2019 | Khan | G06K 9/6232 |
| 2020/0342636 A1* | 10/2020 | Ohba | G06T 3/4053 |

* cited by examiner

AUTOMATIC TAGGING OF IMAGES USING SPEECH RECOGNITION

CROSS-REFERENCE TO RELATED APPLICATIONS

This application claims the benefit of U.S. Provisional Application No. 62/720,741, filed on Aug. 21, 2018, and U.S. Provisional Application No. 62/745,092, filed on Oct. 12, 2018, the entire contents of both of which are hereby incorporated by reference herein.

TECHNICAL FIELD

The present disclosure relates to the field of image processing, and more particularly to automatically tagging detected objects in an image or video with tags obtained from an audio signal.

BACKGROUND

Image tagging, where one or more words or phrases may be associated with a particular image or video, can be a useful tool for classifying and organizing images for later search and retrieval. The ability to tag photos is offered by a variety of different types of software, such as many image manipulation and/or cataloging or organizing applications. Further, various websites, such as social media platforms, may offer tagging in various forms for images posted on each respective platform. Tags can be informative, such as associating key words with objects and/or persons in a given photo or video, dates, places, events, or other relevant data, or may be arbitrary, holding meaning only to the person performing the tagging. Still further, tags may be associated with a photo or video as a whole (e.g. where a tag may be related to a particular event), or only to a specific object or person (e.g. tagging a person). A photo or video may include multiple tags, and a given object or person in a photo or video itself may be the subject of multiple tags.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
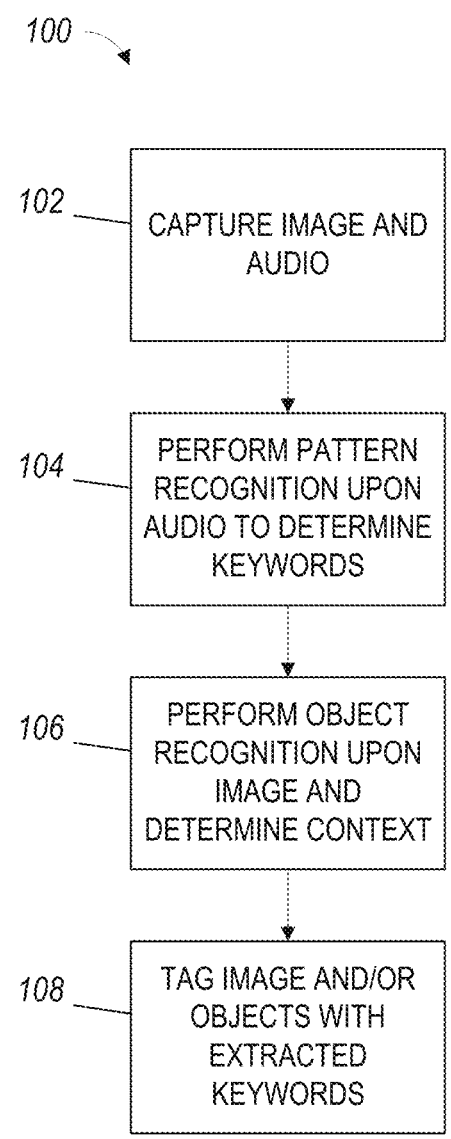
FIG. 1 is a flowchart of a method for automatically tagging images using speech recognition, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Applications for organizing photos and/or videos, including online services, as well as various social media providers, commonly allow for tagging of photos and videos with various keywords. These tags may take various forms, such as associated keywords in a file's metadata, or various hashtags as have become ubiquitous on social media. The tagging of photos and/or videos is typically done manually. A user may enter and/or select from a preexisting list one or more relevant keywords, and then tag the images/video and/or objects within an image or video, thereby associating the images/video with the keyword(s).

Such manual tagging can become tedious. Where a large number of images and/or videos are to be tagged (e.g. importing a collection of photos from a device such as a digital camera, video camera, or smartphone) or there are a large number of objects to tag and/or a large variety of keywords for tags, the process of tagging may consume a significant amount of time, potentially discouraging a user from carrying out exhaustive tagging. Thus, methods to automate the process of tagging, which may facilitate more comprehensive tagging, are desirable. Solutions exist that allow for assigning one or more preselected tags to a collection of images or other media automatically. However, these solutions are typically feasible only where the collection of images or other media are to all have identical tags; where most images or media in the collection require unique tags, existing solutions still require manual tagging of each image that requires a unique tag.

Computing devices that are typically used to capture the still images and/or video, including laptops, desktops, tablets, smartphones, and similar such devices, as well as point and shoot and DSLR cameras, are also often capable of simultaneously capturing audio. Such audio may be in various forms, including the audio stream of a captured video, audio notes, etc. The captured audio may include speech and/or other sounds that relate to the subject matter being captured in the video or still image. Thus, this audio may form a context for the captured images or video, and so may be useful for determining possible keywords for tagging.

In various disclosed embodiments, by processing such audio streams through automatic speech recognition routines, the various keywords can be supplied to a user for tagging any associated images and/or video. The audio may be automatically associated with the images and/or video by virtue of its contemporaneous capture. Consequently, extracted keywords can be tagged to the associated images and/or video with little to no input from a user. In some embodiments, tagging may be automatically performed, thereby relieving the user of the task completely. Further, in still other embodiments, the associated images and/or video may be processed using object recognition, which may allow generation of additional keywords, allow the objects to be independently tagged and/or inform automatic tagging in conjunction with automatic speech recognition.

FIG. 1 depicts the operations of a method 100 for automatically tagging an image from an audio stream. One or more of the various operations may be performed, in whole or in part, by a computer device 500 described herein, or by another suitable device or system. In embodiments, method 100 begins with operation 102, where an image and audio stream are captured. The image may be one or more still images, or a video clip. In various embodiments, the audio may be captured as part of a video clip, or as a separate stream, such as where still images are used with method 100, or in double-system recording, where video and audio are captured separately, for later association and/or merging, such as during editing or another post-production stage. In still other embodiments, the audio may be captured at a separate time from any still images or video, either before or after, and later associated with the video or still images, to be used in conjunction with method 100 to automatically tag selected image(s) or video. For example, a video may be captured on a smartphone or tablet, which may provide both audio and images in the form of video. It will be appreciated that, by associating the audio with video or images at a separate time from capture, potentially any arbitrary audio may be associated with video or images to be tagged. Moreover, one audio track may be associated with multiple different, potentially unrelated, videos or images.

Association of audio and video may be accomplished using any suitable technique that allows the audio to be processed for keyword extraction. For example, association may entail incorporating the audio into an audio track of a video file, which may further require transcoding or encoding the video stream with the audio stream into a single video file. In embodiments where the video and audio are captured contemporaneously by a single device, the video file from the device may already have the audio associated via the device's recording process. In other implementations, the audio and video may be stored as separate files, with association performed via metadata or with reference to an external file, separate from the audio and video. Any method may be used to incorporate or associate audio with a video or still images so long as the audio can be suitably isolated, extracted, or otherwise processed to determine keywords that should be associated with the video or images. Moreover, a device or system executing method 100 may not be responsible for associating audio with video or images; rather, the device or system may simply receive video/images and associated audio for keyword processing.

Where one or more still images are used with method 100, the one or more still images may be taken individually, such as with a still camera, or may be extracted from a video stream, such as via a frame grab. It should be understood that, even when not explicitly stated, the term "image" may include one or more still images, one or more video streams, or any combination of the foregoing. For example, a single audio stream may be used with method 100 to automatically tag a combination of multiple still images and videos.

In operation 104, the audio stream, either recorded as a stand-alone stream or extracted from a video, may be processed through a pattern recognition algorithm. In some examples, the pattern recognition may include an automatic speech recognition (ASR) algorithm or module. In embodiments, the ASR algorithm extracts recognized words from the audio stream. The extracted words may then be parsed to extract candidate keywords for tagging, as will be described in greater detail herein with respect to FIG. 2.

In operation 106, in some embodiments the image(s) or video may be processed with an object recognition algorithm. In some examples, object recognition may provide a list of all identified objects in a given image or video. The identification may include varying degrees of detail, e.g. type of object, object characteristics such as color, orientation, and size, object location in the image or video, time index where the object is visible (in the case of a video, e.g. a time code reference, frame number, or other suitable time or location marker), movement of the object through the frame (in the case of a video), or any other type of information that may be ascertained via object detection and/or correlation with image or video metadata. Object detection may further include facial recognition, where faces may be detected and, in some embodiments, cross-referenced with known faces to potentially establish identity. Object recognition may be performed on one, some, or all images where multiple images are processed against a single audio stream in method 100, or by one or multiple videos. Object recognition further may be used, in some embodiments, to determine appropriate keywords, either as a contextual input to the ASR routine for processing audio, or standing by itself to supplement keywords that may be determined from ASR.

In some embodiments, operation 106 further includes determining a context, in addition to or in lieu of performing object recognition. Determining context may include determining whether the image or video includes any augmented reality (AR) objects that have been overlaid on the image or video. If so, the nature of the AR object, e.g. size, position, shape, type, and other pertinent aspects, may further be determined as useful context for helping to select appropriate keywords for tagging. For example, a video clip (including a live stream, where a viewer of the stream may superimpose an AR object on the fly) may include an arrow pointing to a particular part of an object, e.g. the control panel of a dishwasher, washing machine, water heater, or other household appliance, or a particular part of a plumbing fixture, such as the water tank of a toilet, faucet on a sink, drain pipe under the sink. In another example, the placed AR object may have motion, e.g. a moving arrow or pointer indicating that a user should take a particular action such as twisting, pushing, hammering, etc. In yet another example, the placed AR object may be a shape such as a tool, such as a hammer, screwdriver, wrench, or similar tool, or may be a fixture, such as a toilet, water heater, furnace, etc., or any other arbitrary object. It should be understood that a given image or video may have multiple AR objects overlaid, some at different times (where overlaid on a video), and/or possibly multiple objects simultaneously in a single shot. In still other embodiments, object recognition may be informed by a user designating areas of interest within the video. Object detection may be limited to those areas; by so limiting, objects that may otherwise contribute irrelevant tags can be ignored.

In some implementations utilizing method 100, augmented reality (AR) objects may have been placed within a video or image. The nature of any such AR object, e.g. the object type, size, position in frame, orientation, nature of any movement across or within the frame, etc., may be known as part of data captured during its superimposition. For example, the person placing the AR object may select the object from a library of known objects, with the library also including object characteristics that can be associated with the image or video as metadata, or as a type of tagging similar to the tagging described herein. In another example, such as where a person is creating arbitrary objects or using a dot as a virtual laser pointer, the person creating the object may supply relevant data about the object. In some cases, such as where the AR object is a virtual laser pointer, only the location of the object may be used for contextualization, and may be combined with object recognition to provide a broader context. By way of example, a laser pointer that circles an aspect of an appliance, such as a handle, may help direct object recognition and tagging of not just the appliance, but the particular circled component (e.g. handle, plumbing fitting, junction box, control board, etc.) of the appliance.

In still another example, the AR object or objects may be recognized as part of the previously discussed object recognition operation, much the same as real objects in the image or video, such as where no metadata is available. For example, if AR objects are superimposed over a video which is then subsequently rendered, the resulting video or image(s) typically lack the metadata defining the AR objects, as the objects are simply part of each frame, much the same as the actual objects captured by the camera. As will be understood, AR objects detected by object recognition nevertheless can be used to inform the context for selection of relevant keywords for tagging in operation 108, much the same as any other detected object. In some embodiments, detected objects may be compared to a library of possible AR objects, which may allow discarded metadata to be recovered.

In operation 108, the identified keywords from operation 104 and, in some embodiments, operation 106, are used to tag the image(s) and/or video. In embodiments where object recognition is performed per operation 106, the results of object recognition may be combined with the recognized speech and any context, such as placed AR objects, to provide a broader context for identifying keywords and facilitating tagging, and/or supplementing additional keywords. Tagging may be performed automatically, with the identified keywords tagged or otherwise associated to the image(s) and/or video, including any appropriate identified objects. Where object detection is performed, individual detected objects may each be separately tagged. Where the image or video includes one or more AR objects, the AR objects may help direct selection of relevant vs. non-relevant words, and may serve to bias or override word frequency determinations, as will be discussed in greater detail herein.

For example, where a recognized object is a toilet, an arrow pointing to the water service line may prompt selection of keywords such as wrench, tighten, and loosen from an associated audio stream for tagging to the image or video, which may otherwise have been ignored as marginally relevant or irrelevant.

In other embodiments, a user may make the final decision to tag, with the identified keywords being presented to the user as suggestions for tags, and the user being given the opportunity to confirm or reject suggested tag(s). In still other embodiments, the user may have the opportunity to supplement the list of identified keywords. In embodiments that include object recognition in operation 106, the user may be able to select or change particular objects to tag with suggested keywords.

The tags may be associated with the image(s) and/or video by any method for tagging now known or later developed. The tags may be stored as part of the image metadata, e.g. in an EXIF field or similar structure, in part of a database associated with the stored image(s) and/or video, in a separate file, or in another suitable fashion. Further, tags may be temporally tagged, viz. they may be associated with specific times, such as when video is being tagged. For example, a keyword such as "dishwasher" may be tagged to a specific time index or range of times in a video, during which a dishwasher is visible in-frame; once the dishwasher leaves the frame, the tag "dishwasher" likewise is removed or not in effect. Such time-based tagging can allow use of tagged keywords as an index to relevant time locations within a video. The context for selecting time-based tagging can come from the image context discussed above, where some tags may disappear or be discontinued when context indicates they are no longer relevant.

Figure 2:
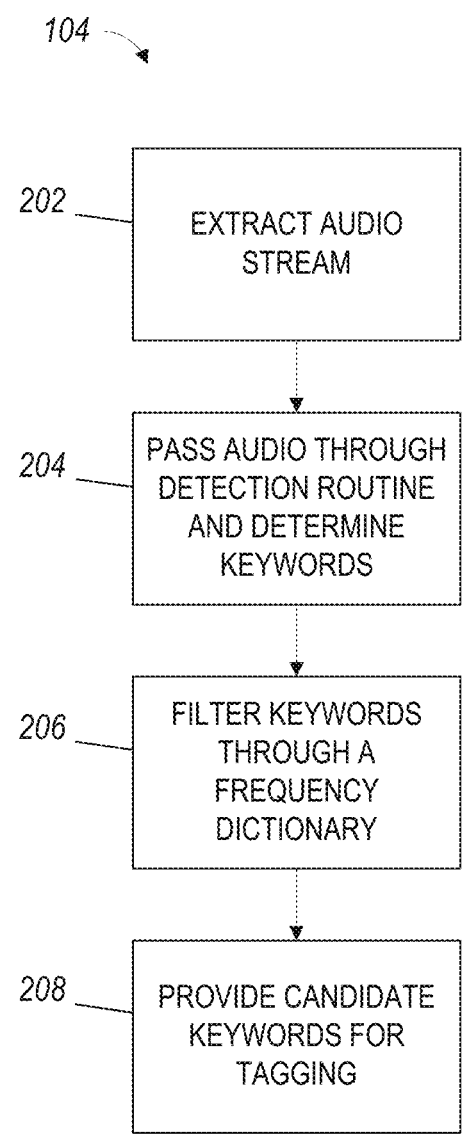
FIG. 2 is a flowchart of operations for processing an audio stream to extract possible keywords for tagging, to be used in the method of FIG. 1, according to various embodiments.

FIG. 2 illustrates in detail various operations, one or more of which may be carried out in whole or in part, in the execution of operation 104 of method 100, namely, the processing of an audio stream to determine keywords for tagging. Starting in operation 202, if necessary, the audio stream is extracted. For example, where the audio stream is part of a video or otherwise associated with other data, the audio stream may be extracted from the non-audio data to allow the automatic speech recognition algorithm to obtain as accurate results as possible. In some embodiments, operation 102 may be effectively omitted, such as where the audio stream is captured in a self-contained file, e.g. WAV or MP3 file that is not otherwise associated with other data, such as an image or video stream. Extraction of the audio stream may be performed prior to running through the automatic speech recognition routine, or, in some embodiments, contemporaneously, e.g., the stream may be extracted on the fly from a source file such as a video, without the need to create a separate file or stream.

In various embodiments, once extracted, the audio stream is passed through a pattern recognition routine in operation 204, to detect and identify various words. In some embodiments, the pattern recognition routine may comprise an automatic speech recognition (ASR) algorithm. Alternatively or additionally, a pattern recognition algorithm configured to detect and recognize sounds other than speech may be utilized. The pattern recognition routine may be capable of recognizing both speech (as an ASR algorithm) and non-speech sounds. In still other embodiments, both an ASR algorithm and a separate pattern recognition specific to non-speech sounds may be applied to the audio stream. For example, a given pattern recognition routine may be able to recognize both detected words as well as detected sounds, e.g. songs, notes, noises, etc. Such a routine may be able to identify songs, vehicles, animals, times (such as a clock chime), alerts (such as beeps or signals from a speaker or electronic buzzer), or any other object that may provide an identifiable noise signature.

In yet other embodiments, a history or library of recognized or tagged sounds may be employed with the pattern recognition routine(s). In such embodiments, a user may have previously tagged an image and/or objects in an image that also have corresponding sounds. These previously detected sounds and/or associated tags may be stored, so that the pattern recognition routine, upon detecting a similar sound, may be able to suggest or automatically supply the previously associated tag(s). In such an example, referring to tagging history may allow the pattern recognition routine to essentially "learn" a user's tag(s) with a given sound, and thereby improve in tagging accuracy with repeated use. Such techniques may further be used with machine learning techniques, where extracted keywords, recognized sounds, recognized objects, and/or other contextual information are provided to a neural net or other machine learning implementation as a training set, to further improve subsequent processing and tagging.

The output from the pattern recognition routine may comprise one or more words or possible tag candidates or candidate words corresponding to the detected audio. In one such example, the ASR routine output may comprise a list of identified words, such as "the, this, me, car, travel, shop, time" and or noises/sounds, such as "bird, dog, car, train", song titles, movie titles, etc. ASR processing may be carried out locally, such as where method 100 is implemented upon a single computer device 500 like a smartphone or laptop, on a remote platform such as a server, data center, or cloud computing platform, or a combination of the foregoing. It should further be understood that the ASR routine may be configured to represent one or more different languages, e.g. English, Chinese, Spanish, Russian, Japanese, etc.

In some embodiments, the ASR and sound detection routines may be supplemented by a dictionary or similar database that correlates sounds with words, to improve detection accuracy. Such a dictionary or database may be user-customizable to expand the range of detectable sounds and/or words. Further, such a dictionary or database may be subject-matter specific, so as to facilitate detection of unusual words or jargon words. For example, where a video or image(s) involves plumbing, a dictionary that includes various words and phrases that are used in the plumbing trade may be utilized by the ASR routines to ensure that plumbing-specific jargon is accurately detected.

In operation 206, the resulting list of words/tag candidates may be filtered using a dictionary of unusual or uncommon words. Typical conversational speech patterns have numerous words that are a common part of a language's syntax, but do not directly correlate to an object such that they would generate a meaningful tag. For example, English words such as "the, they, those, is, if, but, in", etc., are likely to show up in most speech, but may not be meaningful, and thus are undesirable, to use as a tag. Such words may be filtered from the words detected by the ASR routine by comparing each detected word against a dictionary that indicates how frequently a word appears in a language. A threshold of frequency may be established (e.g. percentage of time that a word appears in a given passage of text), where words that appear at or above the frequency threshold, and thus are common and unlikely to be relevant keywords, are filtered. Words that appear less than the frequency threshold may be offered as candidates for keywords to tag.

In some embodiments, multiple thresholds may be implemented. A first threshold can be established, where words that are more frequent are automatically rejected, and a second threshold, lower than the first threshold, established for words that are more rare to be automatically accepted as tags. Words with a frequency between the two thresholds may be offered to a user as suggestions, where the user can determine if any should be used as tags. Other embodiments may offer configurable thresholds, where a user can select how aggressive the routine will be in culling common words. Still other embodiments may offer all words as suggestions to the user, and indicate a percentage of frequency or other indicator of the strength of a detected word or sound to be useful as a tag.

It should be appreciated that a word frequency dictionary is only one possible way to filter detected words and/or sounds. As discussed above with respect to FIG. 1, and in particular with respect to operations 106 and 108, object recognition and context (including any placed AR objects), such as performed in operation 106, may be used in conjunction with, or in lieu of, a frequency dictionary to yield a more accurate and relevant selection of keywords to tag, particularly when method 100 will be used to automatically tag images and/or video. For example, if the ASR routine detects the word "poodle" and the object recognition from operation 106 detects a dog, method 100 may determine that "poodle" is highly relevant, and thus automatically tag the image or video with the dog with "poodle". Such a technique may be useful to select relatively common words that might otherwise be filtered out using just a frequency dictionary. In another example, if the ASR routine detects the word "car" multiple times in the audio stream of a video, and the object recognition of operation 106 detects a single car within much of the video, method 100 may tag the video with "car", despite "car" being a frequently used word that might otherwise be automatically rejected. In still another example, the placement of an AR object may further result in tagging of related words such as "engine", "fuel", "battery", or the like where an AR object suggests attention should be given to specific aspects of the recognized car. In yet another example, recognized objects may be first used to select keywords for automatic tagging prior to filtering with a dictionary in operation 206.

Where object detection includes facial recognition and if the facial recognition includes previous information associating a recognized face with a name, such information may be used in operation 206 to automatically select from the words detected by the ASR routine the name of the recognized face. As above, such selection may be carried out regardless of whether the words of the name would otherwise be rejected if just filtered with a frequency dictionary.

Still further, in some embodiments a custom dictionary may be utilized in addition to or in lieu of a frequency dictionary. The custom dictionary, as with the above-described custom dictionary that may be employed with the ASR routine(s), may be selected based upon its relevance to the video or image subject matter. Thus, the custom dictionary may allow filtering of detected speech and sounds for words and sounds that are relevant to a particular field, e.g. plumbing, automotive, electrical, etc. In some embodiments, the custom dictionary may be the same dictionary used with the ASR routine(s).

With regards to the custom dictionaries that may be used with the ASR routine(s) and/or filtering, the dictionary or dictionaries may be selected on the basis of the context information, discussed above. Thus, where context information (e.g., determined by object recognition) suggests a plumbing issue, a plumbing dictionary may be used for either ASR and/or filtering.

Finally, in operation 208, the resulting keywords from operation 206 can be provided for tagging the images and/or video in operation 108. As described above, such tagging may occur automatically. In other embodiments, such tagging may be semi-automatic, with uncommon words automatically being tagged, common words being rejected, and less common words being suggested to a user as possible candidates that the user can approve or reject.

As described above, the audio stream may be captured contemporaneously with the images, such as part of a video or an audio annotation, or may be recorded later, possibly in an unrelated setting. An audio stream recorded separately, that is otherwise unrelated to the images or video to be tagged, may nevertheless be processed with method 100 and used to tag the images or video. In this way, method 100 may be used with any arbitrary selection of audio and images to tag the images. Moreover, method 100 may be employed by a user sorting and tagging through images/videos to essentially verbally tag images. Multiple images, such as a collection in a photo library, can be tagged with a single audio stream. In this way, software could be configured to perform method 100 across an entire photo and/or video library with a single phrase. When combined with object recognition and an audio recording of selected keywords, such software could use method 100 to automatically tag vast numbers of images automatically. Similarly, multiple audio streams could be used to tag a single image or video, such as by performing method 100 repeatedly upon the single image or video, but with different audio streams.

Figure 3:
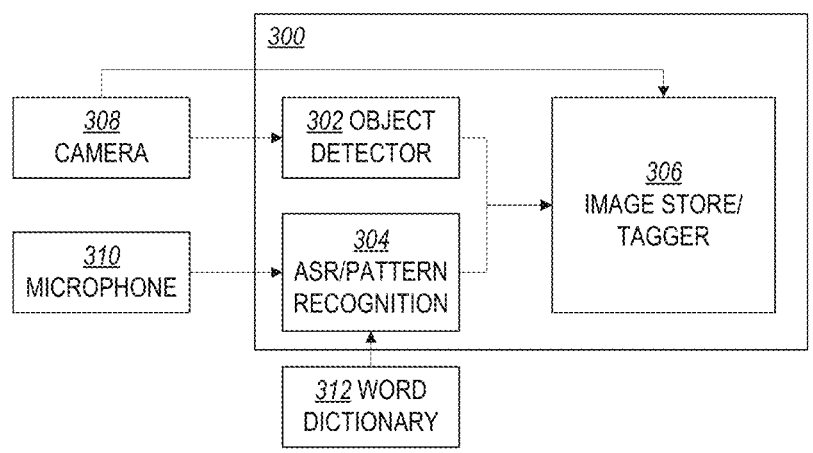
FIG. 3 is a block diagram of an example apparatus that may be configured to carry out the method of FIG. 1, according to various embodiments.

Turning to FIG. 3, a block diagram of a possible system or apparatus to carry out method 100 is depicted. In various embodiments, apparatus 300 includes an object detector 302, an automatic speech recognizer 304, and an image tagger 306. Apparatus 300 may be implemented in whole or in part in software, such as on a computer-readable medium, in hardware using dedicated logic components, such as a field-programmable gate array, or a combination of both. Object detector 302 may be configured to carry out operation 106 of method 100. Automatic speech recognizer 304 may be configured to carry out operation 104 (and by association, operations 202-208) of method 100. Image tagger 306 may carry out operation 108 of method 100.

Apparatus 300 may be in communication with a camera 308 and microphone 310 to receive both images and an audio stream. Camera 308 and microphone 310 may be implemented using any known technology for image and audio pickup and recording. In some embodiments, camera 308 and microphone 310 may be a part of a smartphone, tablet, or other computer. In other embodiments, camera 308 and microphone 310 may be part of a stand-alone video camera. In still other embodiments, camera 308 may be a dedicated still camera such as a DSLR, and microphone 310 may be part of an unrelated recording apparatus. Other embodiments are possible that are useable with method 100. As can be seen, camera 308 may supply images both to object detector 302 and image tagger 306, which may also act as an image store or to otherwise coordinate storage of images. Similarly, microphone 310 may supply an audio stream or streams to automatic speech recognizer 304. These connections should be understood to only be logical; camera 308 (and microphone 310) need not be physically connected to apparatus 300. Camera 308 and microphone 310 may capture and store images and audio to a storage medium or other intermediate repository, to later be retrieved by apparatus 300 in carrying out method 100.

Automatic speech recognizer 304 may receive input from a word dictionary 312, which may be stored separately or as a part of apparatus 300, and may be used in conjunction with operation 206. The word dictionary 312 may be stored as part of automatic speech recognizer 304, as a separate part of apparatus 300, or as an external store that is otherwise accessible to apparatus 300.

Figure 4:
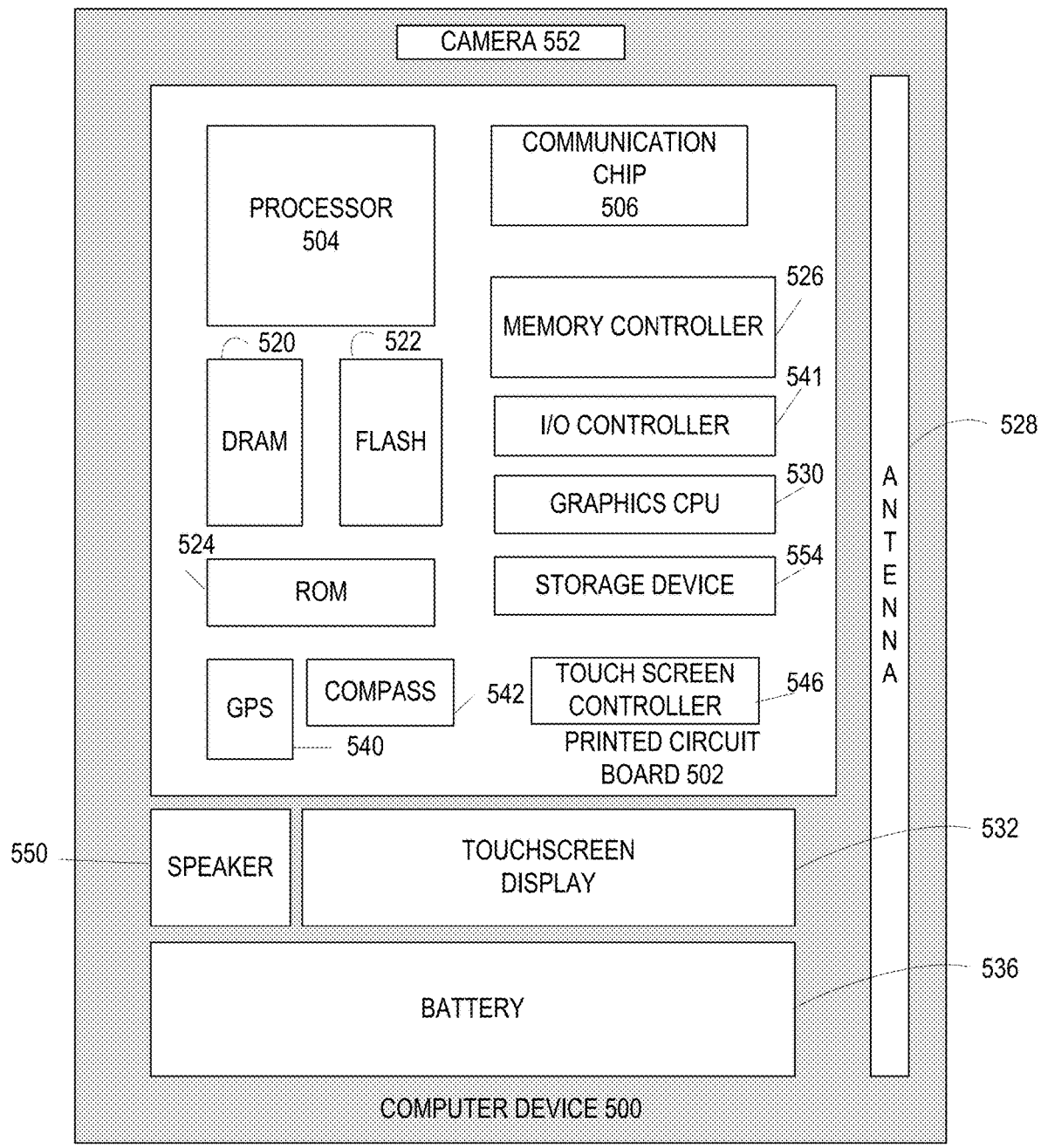
FIG. 4 is a block diagram of an example computer that can be used to implement some or all of the components of the system of FIG. 1, according to various embodiments.

FIG. 4 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the method 100, method 104, object detector 302, ASR/pattern recognition 304, and/or image store/tagger 306 described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

Figure 5:
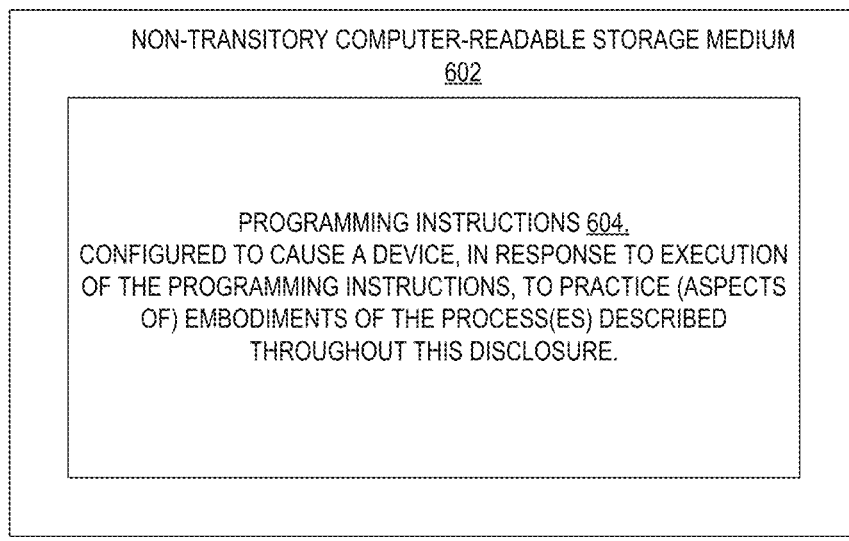
FIG. 5 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) method 100, method 104, object detector 302, ASR/pattern recognition 304, and/or image store/tagger 306. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method, comprising:
performing automatic speech recognition upon an audio signal captured contemporaneously with one or more images to obtain one or more candidate words;
performing object detection upon the one or more images to obtain one or more detected objects;
determining an image context, wherein the image context includes the detected objects;
determining whether the one or more images includes one or more augmented reality objects;
and
if there are no augmented reality objects in the one or more images:
selecting a first set of candidate words, based on the image context, from the obtained one or more candidate words, and
tagging each detected object with at least one of the first set of candidate words; or
if there is at least one augmented reality object in the one or more images:
selecting a second set of candidate words, based on the image context, from the obtained one or more candidate words, the second set of candidate words having at least one candidate word that is not in the first set of one or more candidate words, and
tagging each detected object with at least one of the second set of candidate words.

2. The method of claim 1, wherein the one or more images comprise a video stream.

3. The method of claim 2, wherein tagging each detected object comprises tagging the video stream with different candidate words at different time indexes within the video stream.

4. The method of claim 1, further comprising:
selecting a dictionary based upon the image context; and
filtering the candidate words with the selected dictionary prior to tagging.

5. The method of claim 1, further comprising filtering recognized speech using a word frequency dictionary prior to tagging.

6. The method of claim 1, wherein performing automatic speech recognition comprises detecting speech and non-speech sounds.

7. The method of claim 1, further comprising correlating the one or more candidate words with the one or more augmented reality objects.

8. A non-transitory computer-readable medium (CRM) comprising instructions that, when executed by an apparatus, cause the apparatus to:
perform automatic speech recognition upon an audio signal associated with a video stream to obtain one or more candidate words;
perform object detection upon the video stream to obtain one or more detected objects;
determine a context of the video stream, wherein the context includes the detected objects;
determine whether the video stream includes at least one augmented reality object inserted into the video stream; and
if there are no augmented reality objects in the video stream:
filter the candidate words based at least in part on the context to obtain a first set of one or more tag words, and
tag the video stream with at least one of the first set of tag words; or
if there is at least one augmented reality object in the video stream:
filter the candidate words based at least in part on the context and the at least one augmented reality object to obtain a second set of one or more tag words, and
tag the video stream with the second set of one or more tag words, wherein the second set of one or more tag words has at least one candidate word that is not in the first set of one or more tag words.

9. The CRM of claim 8, wherein the instructions are to further cause the apparatus to obtain one or more additional candidate words from the detected objects.

10. The CRM of claim 8, wherein the instructions are to cause the apparatus to filter the candidate words with a word frequency dictionary.

11. An apparatus, comprising:
an automatic speech recognizer;
an object detector to perform object detection upon a video stream to obtain one or more detected objects; and
an image tagger;
wherein;
the automatic speech recognizer is to:
generate one or more candidate keywords from an audio stream associated with the video stream,
determine an image context that includes the one or more detected objects, and
determine whether the video stream associated with the audio stream includes at least one augmented reality object, and
if there is no augmented reality object in the video stream:
filter, with the automatic speech recognizer, the candidate keywords based at least in part on the image context to derive a first set of one or more tag keywords, and
tag, with the image tagger, the video stream with the first set of one or more tag keywords; or
if there is at least one augmented reality object in the video stream:
filter, with the automatic speech recognizer, the candidate keywords based at least in part on the image context and the, and
tag, with the image tagger, the video stream with the second set of one or more tag keywords, wherein the second set of one or more tag key words has at least one candidate keyword that is not in the first set of one or more tag keywords.

12. The apparatus of claim 11, wherein the audio stream and video stream comprise a single file.

13. The apparatus of claim 11, wherein the object detector is to determine one or more additional candidate keywords from the detected objects.

14. The apparatus of claim 11 wherein the automatic speech recognizer is to filter the candidate keywords using a word dictionary selected based upon the image context.

15. The apparatus of claim 11, wherein the automatic speech recognizer is to generate the one or more candidate keywords from both speech and non-speech sounds contained in the audio stream.

16. The apparatus of claim 15, wherein the automatic speech recognizer is to filter the candidate keywords using a word frequency dictionary.

* * * * *